US009449507B2

(12) United States Patent
Basir

(10) Patent No.: US 9,449,507 B2
(45) Date of Patent: Sep. 20, 2016

(54) TRAFFIC PROFILING AND ROAD CONDITIONS-BASED TRIP TIME COMPUTING SYSTEM WITH LOCALIZED AND COOPERATIVE ASSESSMENT

(75) Inventor: Otman A. Basir, Waterloo (CA)

(73) Assignee: INTELLIGENT MECHATRONIC SYSTEMS INC., Waterloo (CA)

( * ) Notice: Subject to any disclaimer, the term of this patent is extended or adjusted under 35 U.S.C. 154(b) by 210 days.

(21) Appl. No.: 12/956,168

(22) Filed: Nov. 30, 2010

(65) Prior Publication Data

US 2011/0130947 A1 Jun. 2, 2011

Related U.S. Application Data

(60) Provisional application No. 61/264,912, filed on Nov. 30, 2009.

(51) Int. Cl.
*G08G 1/00* (2006.01)
*G01C 21/34* (2006.01)
*G08G 1/01* (2006.01)
(Continued)

(52) U.S. Cl.
CPC .......... *G08G 1/0104* (2013.01); *G08G 1/0125* (2013.01); *G08G 1/0967* (2013.01); *G08G 1/09626* (2013.01)

(58) Field of Classification Search
CPC .... G08G 1/01; G08G 1/0112; G08G 1/0125; G08G 1/0133; G08G 1/091; G08G 1/0962; G08G 1/09262; G08G 1/0967; G08G 1/096775; G08G 1/0968; G08G 1/096872; G01C 21/3415; G01C 21/3492
USPC ......................... 701/117, 119, 414, 423, 118
See application file for complete search history.

(56) References Cited

U.S. PATENT DOCUMENTS 4,591,823 A * 5/1986 Horvat .................. G08G 1/052 340/466
5,177,685 A * 1/1993 Davis ................. B60R 16/0373 340/988

(Continued)

FOREIGN PATENT DOCUMENTS

DE 10134108 A1 1/2003
DE 10 2007 062958 A1 6/2009

(Continued)

OTHER PUBLICATIONS

European Search Report for EP Application No. 10252036.8, Aug. 10, 2012.

*Primary Examiner* — Thomas G Black
*Assistant Examiner* — Sara Lewandroski
(74) *Attorney, Agent, or Firm* — Carlson, Gaskey & Olds, P.C.

(57) ABSTRACT

This invention localizes traffic condition detection and classification to a vehicle. Vehicles work cooperatively to fuse their traffic condition assessments so as to produce larger geographical coverage and more reliable evidence of the conditions. The system can be executed on an onboard device which includes at least one of the following: GPS capabilities, connection connected to the vehicle to measure vehicle speed, or communication with a cell phone. In the example of the cell phone, speed can be computed from phone GPS, a GPRS/CDMA, or both. Otherwise, vehicle speed can be determined obtained from in-vehicle on-board diagnostic system (e.g. using the OBD-II protocol) or based on GPS and accelerometer readings.

10 Claims, 2 Drawing Sheets

(51) Int. Cl.
*G08G 1/0967* (2006.01)
*G08G 1/0962* (2006.01)

(56) References Cited

U.S. PATENT DOCUMENTS

| | | | | | |
|---|---|---|---|---|---|
| 5,182,555 | A * | 1/1993 | Sumner | G08G 1/0104 | 340/905 |
| 5,654,908 | A | 8/1997 | Yokoyama | | |
| 5,889,477 | A | 3/1999 | Fastenrath | | |
| 6,253,146 | B1 * | 6/2001 | Hanson | G01C 21/3415 | 340/905 |
| 6,329,932 | B1 * | 12/2001 | Fastenrath | G08G 1/0104 | 340/934 |
| 6,334,087 | B1 * | 12/2001 | Nakano | G01C 21/3632 | 701/410 |
| 6,401,027 | B1 * | 6/2002 | Xu | G08G 1/0104 | 340/988 |
| 6,456,936 | B1 | 9/2002 | Neukirchen et al. | | |
| 6,542,818 | B1 | 4/2003 | Oesterling | | |
| 6,615,130 | B2 * | 9/2003 | Myr | G01C 21/3492 | 340/988 |
| 6,650,948 | B1 | 11/2003 | Atkinson et al. | | |
| 6,862,524 | B1 * | 3/2005 | Nagda | G01C 21/3492 | 340/988 |
| 6,879,836 | B2 | 4/2005 | Nakamoto et al. | | |
| 6,911,918 | B2 * | 6/2005 | Chen | G08G 1/0104 | 340/905 |
| 7,233,861 | B2 | 6/2007 | Van Buer et al. | | |
| 7,430,472 | B2 | 9/2008 | Zhao et al. | | |
| 7,609,172 | B2 | 10/2009 | Rozum et al. | | |
| 7,831,384 | B2 | 11/2010 | Bill | | |
| 7,908,080 | B2 * | 3/2011 | Rowley | G06Q 30/0267 | 340/995.13 |
| 8,180,558 | B1 * | 5/2012 | Marko | G08G 1/0112 | 340/936 |
| 8,207,866 | B2 * | 6/2012 | Hatami | G08G 1/0962 | 340/905 |
| 2002/0156573 | A1 | 10/2002 | Stefan et al. | | |
| 2004/0038671 | A1 * | 2/2004 | Trayford | G08G 1/096716 | 455/414.3 |
| 2004/0073355 | A1 * | 4/2004 | Yates | G08G 1/096716 | 701/117 |
| 2004/0128066 | A1 * | 7/2004 | Kudo | G01C 21/3617 | 701/468 |
| 2004/0225437 | A1 * | 11/2004 | Endo | G01C 21/34 | 701/415 |
| 2005/0099321 | A1 * | 5/2005 | Pearce | 340/995.13 | |
| 2005/0099322 | A1 * | 5/2005 | Wainfan | G08G 1/202 | 340/995.13 |
| 2005/0107944 | A1 * | 5/2005 | Hovestadt | G01C 21/3691 | 701/423 |
| 2005/0222750 | A1 * | 10/2005 | Tsuge | G08G 1/096844 | 701/117 |
| 2006/0055565 | A1 * | 3/2006 | Kawamata | G08G 1/0962 | 340/995.13 |
| 2007/0038360 | A1 * | 2/2007 | Sakhpara | G08G 1/0104 | 701/117 |
| 2008/0051971 | A1 * | 2/2008 | Sung | G08G 1/092 | 701/93 |
| 2008/0071465 | A1 * | 3/2008 | Chapman | G01C 21/3691 | 701/117 |
| 2008/0081641 | A1 | 4/2008 | Smith et al. | | |
| 2008/0162028 | A1 * | 7/2008 | Satoh | G08G 1/096716 | 701/118 |
| 2008/0252487 | A1 | 10/2008 | McClellan et al. | | |
| 2008/0255754 | A1 * | 10/2008 | Pinto | G01C 21/3691 | 701/119 |
| 2008/0270015 | A1 * | 10/2008 | Ishikawa | G01S 5/0027 | 701/119 |
| 2009/0036148 | A1 | 2/2009 | Yach | | |
| 2009/0063030 | A1 * | 3/2009 | Howarter | G08G 1/096783 | 701/117 |
| 2009/0105933 | A1 * | 4/2009 | Wlotzka | B60R 1/00 | 701/117 |
| 2009/0109058 | A1 * | 4/2009 | Kim | G08G 1/123 | 340/905 |
| 2009/0131115 | A1 * | 5/2009 | Kretz | G06F 17/30067 | 455/566 |
| 2009/0140883 | A1 * | 6/2009 | Rani | G08G 1/20 | 340/936 |
| 2009/0164110 | A1 | 6/2009 | Basir | | |
| 2009/0318119 | A1 | 12/2009 | Basir et al. | | |
| 2010/0023246 | A1 * | 1/2010 | Zhao | G01C 21/3492 | 701/117 |
| 2010/0036595 | A1 * | 2/2010 | Coy | G08G 1/0104 | 701/119 |
| 2010/0094532 | A1 * | 4/2010 | Vorona | G08G 1/0104 | 701/119 |
| 2010/0100307 | A1 * | 4/2010 | Kim | G01S 5/0027 | 701/119 |
| 2010/0106411 | A1 | 4/2010 | Nirhamo et al. | | |
| 2010/0138140 | A1 * | 6/2010 | Okuyama | G08G 1/096822 | 701/117 |
| 2010/0211301 | A1 * | 8/2010 | McClellan | G08G 1/0104 | 701/119 |
| 2012/0083995 | A1 * | 4/2012 | Vorona | G08G 1/0104 | 701/119 |
| 2012/0289253 | A1 * | 11/2012 | Haag | G06Q 50/26 | 455/456.2 |
| 2013/0124074 | A1 * | 5/2013 | Horvitz | G01C 21/3461 | 701/119 |
| 2013/0131921 | A1 * | 5/2013 | Uhlmann | B61L 29/24 | 701/36 |
| 2013/0289860 | A1 * | 10/2013 | Finnis | G08G 1/0962 | 701/117 |
| 2013/0289862 | A1 * | 10/2013 | Chapman | G01C 21/3691 | 701/118 |
| 2014/0025281 | A1 * | 1/2014 | Zhao et al. | 701/118 | |

FOREIGN PATENT DOCUMENTS

| | | | |
|---|---|---|---|
| EP | 1 986 170 | A2 | 10/2008 |
| WO | WO 2009080073 | A1 * | 7/2009 |

* cited by examiner

TRAFFIC PROFILING AND ROAD CONDITIONS-BASED TRIP TIME COMPUTING SYSTEM WITH LOCALIZED AND COOPERATIVE ASSESSMENT

This application claims priority to U.S. Provisional Application Ser. No. 61/264,912, filed Nov. 30, 2009.

BACKGROUND OF THE INVENTION

This application relates to trip time computation, and more specifically to a system for computing trip time that includes traffic profiling and road condition-based computation with localized and cooperative assessment.

Previous traffic determination systems have estimated traffic using triangulated positioning of cell phones to determine a speed at which a cell phone moves. There are many limitations and drawbacks in the current systems. For example, if a phone moves quite slowly, it may be assumed that a driver carrying the phone is driving in traffic.

SUMMARY OF THE INVENTION

This invention localizes traffic condition detection and classification to a vehicle. Vehicles work cooperatively to fuse their traffic condition assessments so as to produce larger geographical coverage and more reliable evidence of the conditions. The system can be executed on an onboard device which includes at least one of the following: GPS capabilities, connection connected to the vehicle to measure vehicle speed, or communication (or integration) with a cell phone. In the example of the cell phone, speed can be computed from phone GPS, a GPRS/CDMA, or both. Otherwise, vehicle speed can be determined obtained from in-vehicle on-board diagnostic system (e.g. using the OBD-II protocol) or based on GPS and accelerometer readings.

These and other features of the present invention can be best understood from the following specification and drawings, the following of which is a brief description.

DETAILED DESCRIPTION OF THE PREFERRED EMBODIMENT

Figure 1:
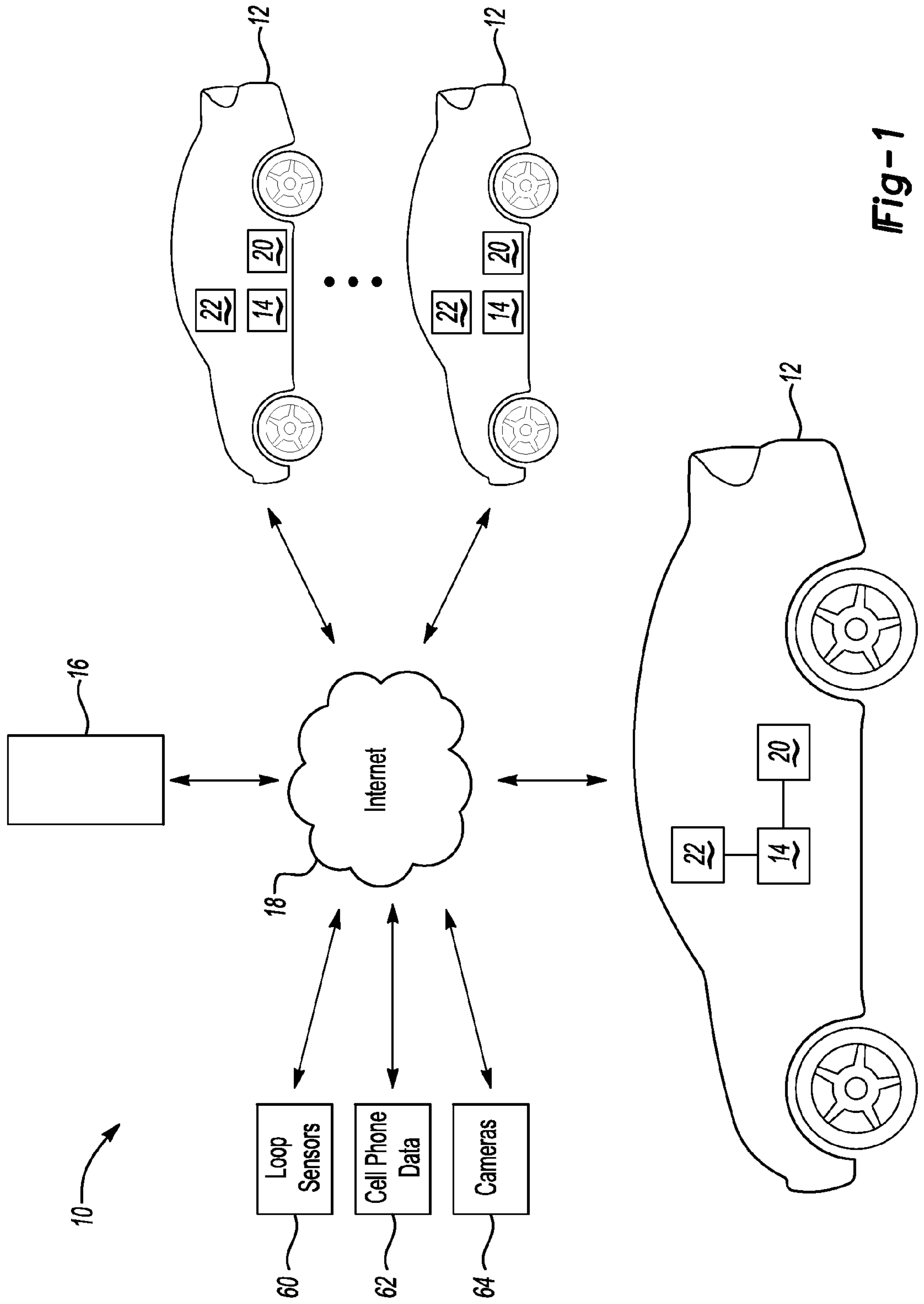
FIG. 1 schematically illustrates a traffic profiling system.

FIG. 1 schematically illustrates a traffic profiling system 10. A vehicle 12 includes an onboard traffic conditions computer 14 (hereinafter "onboard device"). In one example the onboard device 14 includes some or all of the features in the commercially available iLane® product (see http://www.ilane.ca/), also described in co-pending application U.S. Pat. App. 20090318119, filed Jun. 19, 2009, which is hereby incorporated by reference in its entirety. A server 16 is operable to communicate wirelessly with the onboard device 14 via a wide-area network, such as the Internet 18, or a private network or channel. Similar onboard devices 14 are installed on numerous vehicles 12 in the same geographic area and also communicate with the server 16. The server 16 may also receive traffic information from loop sensors 60, cell phone data 62, cameras 64 or other known sources of traffic information, which can be fused with information from the onboard devices 14.

Figure 2:
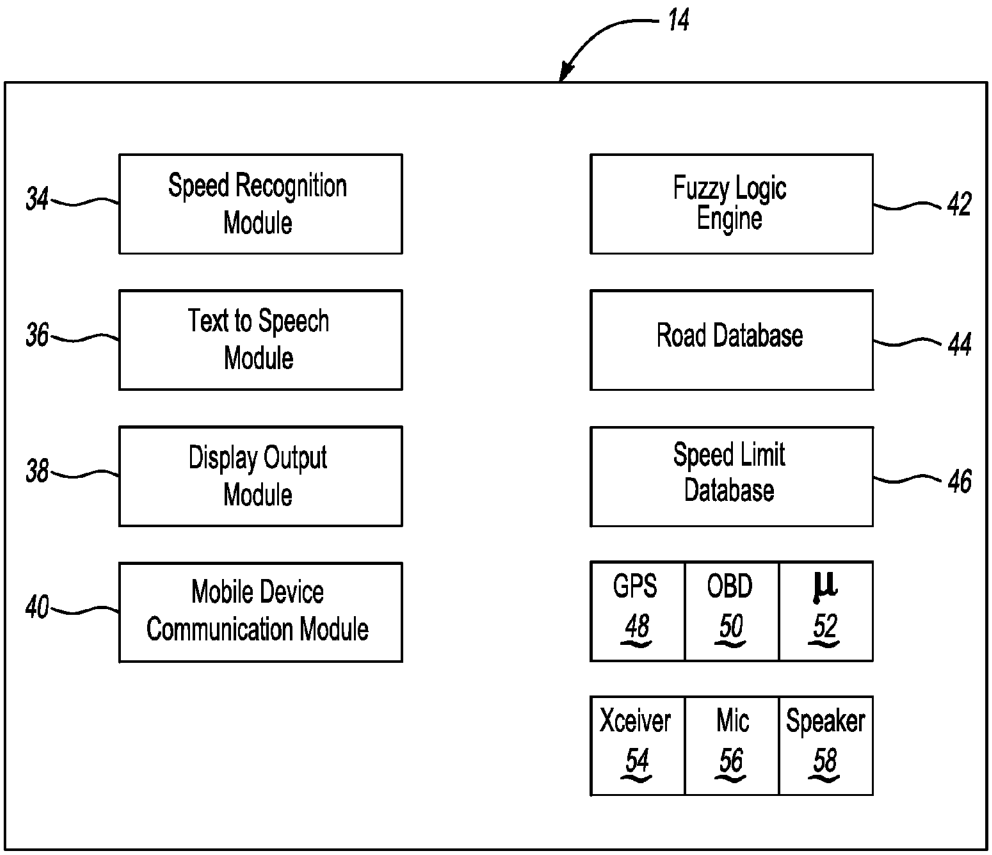
FIG. 2 schematically illustrates an onboard device for a vehicle in the system of FIG. 1.

The onboard device 14 is schematically illustrated in greater detail in FIG. 2. The onboard device 14 includes a road database 44 and a speed limit database 46 indicating speed limits on the road segments in the road database 44. The road database 44 and speed limit database 46 may be pre-stored on the onboard device 14 or downloaded and/or updated from the server 16. If the road database 44 and speed limit database 46 are downloaded and/or updated from the server 16, they may be downloaded and/or updated only for roads in the vicinity of the vehicle 12. The vicinity may be defined as an area around the vehicle 12 which is set to be dependent on density of roads and density of populations (e.g., the higher the density the smaller is the area).

The onboard device 14 includes a processor 52 and storage for storing the data and programs to perform the functions described herein. The onboard device 14 may include a GPS receiver 48, or may receive GPS location from a cell phone or other mobile device 22 (FIG. 1). The onboard device 14 includes an OBD port 50 for receiving on-board diagnostic information from an OBD port (or OBD-II or any other protocol) on the vehicle 12. A mobile device communication module 40 provides wireless (or alternatively, wired) communication with the mobile device 22 to provide communication to the server 16 and to obtain information from the mobile device 22 itself (contacts, email, GPS location information, etc). The onboard device 14 may also include one or more wireless transceivers 54 to communicate directly with cell towers to access the Internet 18 and/or with wireless transceivers 54 on other vehicles 12. The onboard device 14 further includes a microphone 56 for receiving voice commands from a user and a speaker 58 for giving audible information to the user. The speaker 58 could alternatively be part of the vehicle 12 audio system. The onboard device 14 preferably communicates with the user primarily via voice, although a display output module 38 for sending information to a display 20 could also be provided. Thus, the onboard device 14 includes a speech recognition module 34 and a text-to-speech module 36.

Although the vehicle 12 is illustrated as being an automobile, it is understood that the onboard device 14 could be applied to other vehicles too, such as motorcycles, bicycles, etc.

Since the onboard device 14 may be used by a vehicle operator (e.g. a driver), by a vehicle passenger (e.g. limousine passenger), or by another party, the term "user" will be used to refer to a person interacting with the onboard device 14.

Localized Assessment

Figure 3:
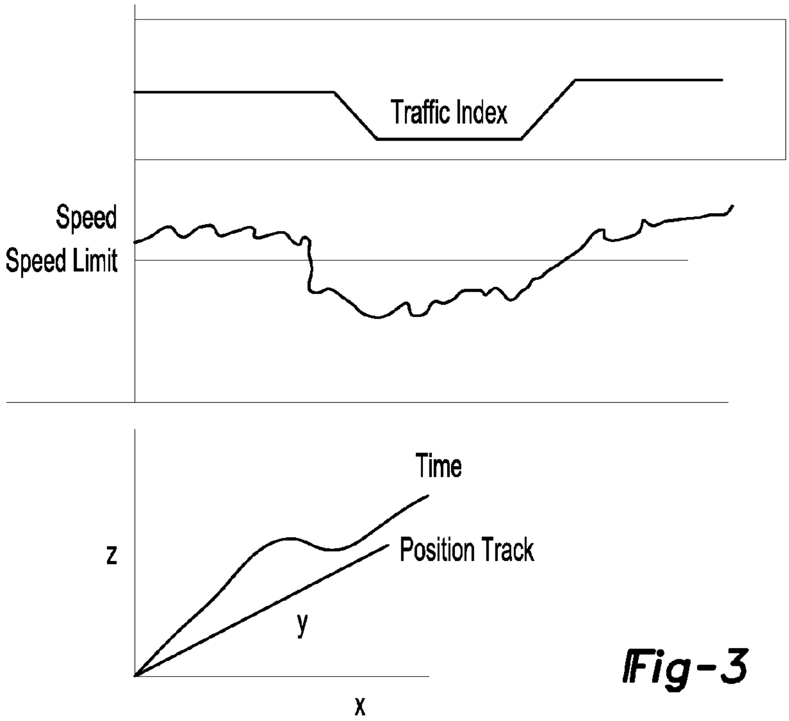
FIG. 3 schematically illustrates an example traffic index.

The system 10 determines its location relative to the database of roads 44 based upon (for example) the GPS location information and then obtains the current speed limit of the current road segment from the speed limit database 46. The onboard device 14 determines its current speed based upon information from the GPS receiver 48 and/or from the speed information available on the OBD 50 and/or from an accelerometer on the onboard device 14. The onboard device 14 compares the current speed limit with the current estimated speed of the vehicle 12, and computes a traffic condition index based on the comparison of speed with the speed limit, and indexed to position, as shown in FIG. 3. The index is one of a number of traffic condition classes (see, e.g., FIG. 3). If at the time the traffic index matches some traffic conditions criteria, a spatio-temporal profile of the traffic index is transmitted to the server 16. For example, if the index indicated the presence of traffic congestion, then a message is sent to the server 16 indicating a traffic congestion event along with the profile. The message includes the time, road segment, location and current speed.

Thus, the onboard device 14 is operable to perform a "localized assessment" on the vehicle 12 of traffic (e.g., comparing a speed limit to a current vehicle speed).

Cooperative Assessment

The onboard device 14 is responsive to voice commands via speech recognition module 34 (see FIG. 2). In one example, a user who recognizes a traffic congestion event can choose to send a traffic profile report alert to the server 16 by using a voice command to tell the onboard device 14 to send a traffic report alert to the server 16 in the form of a natural language sentence such as "very heavy road congestion," "congestion due to an accident," "congestion due to slippery conditions," etc. The onboard device 14 will send the sentence along with a time and a location of the vehicle 12.

In this example, the server 16 parses the sentences it receives to estimate the traffic condition in and around the reported location of the report. An algorithm at the server 16 is used to process the parsed sentences to compute a traffic conditions profile throughout the road network and to determine and eliminate outlier reports or incorrect reports. A similar algorithm may be used to process the traffic condition indices in the "Localized Assessment" section above.

Thus, the onboard device 14 is also operable to perform a "cooperative assessment" because there is some interaction or discourse between the onboard device 12 and the user to assess traffic conditions.

Merging of Traffic Data from Multiple Sources

Whenever possible, the server 16 may fuse the parsed sentences from many users for the area and reported indices from many vehicles 12 for the area to compute a reliable and explainable traffic condition for a traffic segment, leading to determination of the traffic conditions in the area. Furthermore, this information may be fused with traffic data obtained from other sources, such as loop sensors 60, cameras 64, and GSM-mobility data 62. Such diverse multi-source reports allow for high confidence and more accurate traffic conditions estimation. The server 6 may process parsed sentences (the cooperative assessments) and indices (the localized assessments) collected from multiple vehicles 12 to establish time and contextual statistical traffic record for an area, and to ensure accuracy of traffic data.

Road Condition Inquiries from Onboard Device

The onboard device 14 can send inquiries about road conditions on a certain road segment to the server 16. Based on the processed reported sentences and indices received from multiple vehicles 12, the server 16 can send the inquirer a response indicating the traffic condition of the area. Also, in this case other traffic profiling data from GPRS/GSM and loop sensors may be used to compose a report. If no report or index is available for the area then a message is sent to the onboard device 14 indicating such condition (e.g., a "no incident" or "no data available" response is sent to the onboard device 14). The onboard device 14 conveys the information to the operator of the vehicle 12 using voice (using Text to Speech module 36 in FIG. 2) or congestion color code road map on a display 20 (using Display Output module 38 in FIG. 2). Of course, other reporting methods would be possible. This information may also be reported on a web portal for viewing (e.g. on the display 20).

Selective Transmission of Traffic Alerts

The server 16 may receive traffic condition reports from many vehicles 12, and the server 16 continuously processes those reports to determine traffic alerts. Onboard devices 14 may be used to navigate the user via a calculated route to a destination. The destination of the vehicle 12 may otherwise be known or may be deduced (e.g. based upon driving patterns, such as driving home after work on weekdays). The server 16 determines the vehicles 12 who are affected by the alert (based upon their current locations and based upon the known or assumed destinations) and sends the alerts to those affected vehicles. Additionally, or alternatively, where the destination is not known, road segments in the area in the direction that the vehicle 12 is heading are considered relevant. For example, based on destination and location of vehicle 12, an alert may be sent to the vehicle 12. Vehicles not affected by the condition are not bothered and the server 16 may choose to not even send the report to those vehicles.

Trip Time Computation

If a vehicle 12 operated has programmed their destination into the onboard device 14 or the server 16, then the trip time to the destination may be computed based on routing data and traffic conditions on the route. The onboard unit 14 or the server 16 determine a sequence of road segments, which can be computed onboard or can be obtained from a generic routing service provider such as MapQuest. The onboard unit 14 or the server 16 then checks if a road segment is affected by a congestion situation. If a segment is determined to be affected by a traffic congestion event, the travel time for the segment may be recomputed and the trip time to destination may be updated, and the user may be informed of the updated trip time (e.g. via Text to Speech module 36). Alternatively, if a segment on the route is determined to be affected by a traffic congestion event, then the route can be recalculated to avoid the congested segment.

Timed Event Functionality

If the user programs a timed event (e.g. such as a meeting, can be fetched from calendar on mobile device 22), the onboard device 14 may provide a proper warning on the possibility of missing the meeting (e.g. providing a computer generated speech message to the user). The onboard device 14 may offer to call the meeting inviter to allow the user to notify the meeting inviter of a possible delay, or may offer to transmit an email message or a text message to the user to provide the notification. The call, email, or text message may be performed using a mobile device 22 that the onboard device 14 communicates with via Mobile Device Communication module 40.

The onboard device 14 may suggest to the user a superior route to the destination that would exhibit less traffic. Thus, the onboard device 14 may perform a less traffic congestion routing feature.

If the user enters a meeting location and time in his mobile device 22 or office computer calendar, the system 10 will continue to monitor traffic conditions that affect the roads between the user's current location and that where the meeting will take place. If the onboard device 14 or server 16 determine that a difference between the present time and that when the meeting will take place is becoming critically tight for the user to travel to the meeting place, a warning may be sent to the user on his computer or mobile phone 22 to warn him/her that timing is getting tight for them to make it to the meeting. The user can add some safety factors in the form of extra time (e.g., if it takes 2 hours to travel to the meeting place, and the difference between the present time and the meeting starting time is 2 hours, the user may ask the system to allow for 30 minutes extra, and the system 10 may provide the warning 30 minutes before the present time).

Information Sharing

In addition to uploading a traffic profile report to the server 16, the system 10 may use short range communication capabilities of the transceiver 54 of the onboard device 14 to broadcast to vehicles in its vicinity the presence of traffic congestion. Thus, in one example, traffic information may be shared directly between onboard devices 14 in vehicles within a predefined proximity to each other. Alternatively, the information could be transmitted via the Internet or even via the server 16 (although, without filtering or fusion with other sources) between other onboard devices 14 within a radius of one another.

Information Weighting

Since the server 16 receives information about traffic from multiple vehicles 12 and other sensors 60, 62, 64, the server 16 may assign weights of evidence to the different sources and combine the information from the different sources and assign a weight of evidence (or confidence factor) on the traffic condition.

Abstraction of Traffic Conditions

In one example, the system 10 employs multi-level abstraction of traffic conditions of a road segment that ranges from numerical traffic data such as speed (e.g., "Current speed on road segment is 70 km/hour") to linguistic natural language traffic descriptors (e.g., "Traffic condition on the road segment is very slow"). A Fuzzy Logic Engine 42 (see FIG. 2) may be used to produce linguistic traffic descriptors from speed range measurements.

The Fuzzy Engine 42 allows the user to discourse with the onboard device 14 inquire about the traffic conditions. For example, the user can ask questions such as traffic conditions on current road on which the vehicle is being driven. The system 10 will scan the road and report using natural language traffic conditions at high level (e.g. "traffic is slow," or "somehow slow," or "very slow," or "smooth on a road segment"). The user can ask questions to the onboard device 14 (e.g., "Tell me traffic conditions on east bound," "Tell me traffic conditions on north bound," etc.). The onboard device 14 can take the name of a road uttered via voice by the user to a segment on the road or the whole road. For example, the system can determine based on vehicle location the interpretation of east bound relative to the vehicle location. That is, the system 10 can use the location and/or direction of vehicle 12 movement to determine relevant segment of the road that the user is interested in. The user can ask the system to provide more detailed information (e.g. by asking "How slow?"). Where the system 10 provides a current speed range on the segment (e.g., "Traffic is moving with speed between 40 to 50 km an hour"), the user can ask a question in response (e.g. "How bad is traffic on the segment?). The system 10 can answer with a speed range and possible a duration for which that speed range has been experienced by other users. The system can also say speed is starting to pick up. The user can set an alert flag, such that the system 10 will monitor traffic on the trip path and report emerging deteriorating/improving traffic conditions.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method for measuring traffic including:

a) determining a current location of a vehicle from a gps receiver;

b) accessing a database to determine a current speed limit based upon the current location of the vehicle;

c) determining a current speed of the vehicle from the gps receiver or from a vehicle on-board diagnostic system;

d) comparing the current speed of the vehicle to the current speed limit;

e) receiving a natural language voice description of traffic from a user in the vehicle;

f) parsing the natural language voice description of traffic with a processor to estimate a traffic condition at the current location of the vehicle; and g) determining a traffic condition including a traffic congestion event based upon said steps d) and f);

wherein said steps a-e) are performed on the vehicle.

2. The method of claim 1 further including reporting the traffic condition to a remote server.

3. The method of claim 2 further including merging the traffic condition with reported traffic conditions from other vehicles.

4. The method of claim 2 wherein the processor requests traffic information from the remote server for road segments other than a current road segment based upon a current direction of travel of the vehicle and based upon the current location of the vehicle.

5. The method of claim 1 further including abstracting numerical traffic condition information to generate speech to report the traffic condition to a user in the vehicle.

6. The method of claim 5 wherein the step of abstracting the traffic information includes producing linguistic traffic descriptors from numerical speed range measurements.

7. The method of claim 1 further including the step of associating the traffic congestion event with the current location, based upon said step g) and said step a).

8. The method of claim 7 further including receiving a plurality of spoken descriptions from a plurality of different users, parsing the plurality of spoken descriptions to determine a plurality of traffic conditions and merging the plurality of traffic conditions.

9. The method of claim 7 further including receiving a request for traffic condition information, and performing an abstraction of the traffic condition associated with the current location and then communicating the abstracted traffic condition via speech.

10. The method of claim 9 wherein the processor produces the abstraction of the traffic condition by producing linguistic traffic descriptors from numerical speed range measurements.

* * * * *